(No Model.)
L. P. HALLADAY.
BICYCLE.
No. 477,179. Patented June 14, 1892.
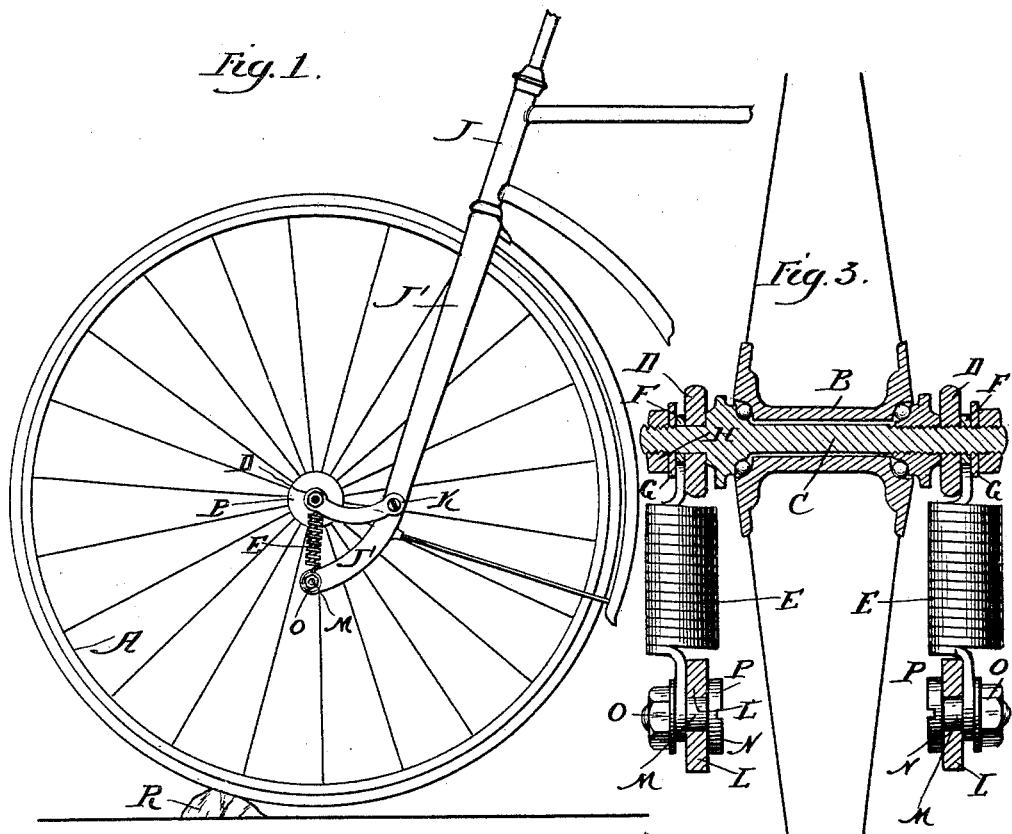
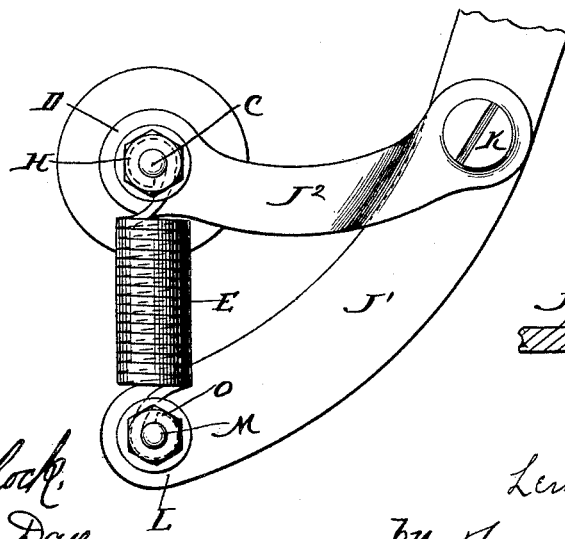
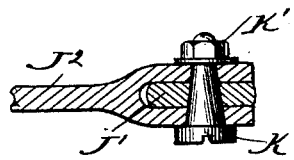
Witnesses:
H. B. Hallock,
Harriet M. Day.
Inventor
Lewis P. Halladay.
by Francis W. Parker,
Attorney.

UNITED STATES PATENT OFFICE.

LEWIS P. HALLADAY, OF CHICAGO, ILLINOIS, ASSIGNOR TO THE MARION CYCLE COMPANY, OF MARION, INDIANA.

BICYCLE.

SPECIFICATION forming part of Letters Patent No. 477,179, dated June 14, 1892.

Application filed June 15, 1891. Serial No. 396,267. (No model.)

*To all whom it may concern:*

Be it known that I, LEWIS P. HALLADAY, a citizen of the United States, residing at Chicago, in the county of Cook and State of Illinois, have invented a new and useful Improvement in Bicycles, of which the following is a specification.

My invention relates to bicycles, and has for its object to provide a convenient means for elastically supporting the frame. It is illustrated in the accompanying drawings, wherein—

Figure 1 is a side elevation of the forward wheel of a bicycle with my improvements applied. Fig. 2 is an enlarged detail view of the same. Fig. 3 is a cross-section through a wheel, showing the operation of my device in detail. Fig. 4 is a detail of the connection between the fork and link.

Like parts are indicated by the same letters in all the figures.

A is the wheel, provided with the hub B on the axle C. These axles extend laterally and carry the link ends D D.

E E are spiral springs, preferably of spring metal, rectangular in cross-section, and each is at its upper end looped about the axle, as at F. On the axle outside of this loop is placed first the washer G and then the nut H. The nut is securely driven home to hold all the parts together.

J is the forward standard of the machine, bifurcated at its lower end so as to form a fork of two parts J' J'. To each of these parts is pivoted the link J², which terminates in the link end D. The link J² is pivotally secured to the fork J' by means of the bolt K and nut K', which pass through the fork and link. The lower end of the fork J' is curved forwardly and terminates in the end L, which is provided with a bolt M, having at one end the head N and at the other the nut O, adapted to clamp the loop P of the spring E, so as to securely attach the same to the lower end of the loop J'.

The features illustrated, which form no part of my invention, I do not further describe.

The arrangement and relation of the several parts may of course be considerably changed without departing from the spirit of my invention.

P illustrates an obstruction just encountered by the forward wheel A and over which it is rising.

The use and operation of my invention are as follows: The parts constructed, as shown, are so related that the weight of the rider, supported by the forward wheel, is supported thereon or therefrom by the springs E E, the pressure upon such springs being in a line substantially vertical and through the axis of the wheel. The springs are normally constructed so as preferably to form a closed coil, and this coil gives or the spring is extended as the weight is thrown upon it. The rigidity of the link J² is sufficiently compensated for by the elasticity of the spring E. When an obstruction is encountered, as indicated in Fig. 1, the spring E expands under the tendency of the wheel to rise over such obstruction, and this action takes place so freely, the spring being so far expanded that the contact with the obstruction is almost imperceptible to the rider.

I claim—

1. The combination of a bicycle-frame with a wheel, a spring-hanger suspended on the axle of such wheel, and a connection between the frame and spring in a substantially vertical line beneath such axle, so that the frame is spring-supported from the axle.

2. The combination of a bicycle-frame with a link pivoted to the axle and to such frame and a spring-hanger secured to the axle and to the lower end of such frame, whereby the latter is spring-supported on the axle.

LEWIS P. HALLADAY.

Witnesses:
HARRIET M. DAY,
JULIA USLER.